United States Patent [19]
Sakamoto et al.

[11] Patent Number: 5,454,322
[45] Date of Patent: Oct. 3, 1995

[54] SHOCK DETECTING DEVICE

[75] Inventors: Kazunori Sakamoto, Chiryu; Masanobu Ishikawa, Nagoya; Koji Ito, Kariya; Yutaka Kondoh, Toyota, all of Japan

[73] Assignee: Aisin Seiki Kabushiki Kaisha, Kariya, Japan

[21] Appl. No.: 17,299

[22] Filed: Feb. 12, 1993

[30] Foreign Application Priority Data

Feb. 14, 1992 [JP] Japan ................................ 4-028402

[51] Int. Cl.$^6$ .......................... F42C 15/21; F42C 15/285
[52] U.S. Cl. ........................ 102/247; 102/252; 102/256
[58] Field of Search ................................ 102/231, 236, 102/241, 245, 247, 234, 235, 239, 242, 246, 251, 254, 255, 256, 233, 252

[56] References Cited

U.S. PATENT DOCUMENTS

| | | | |
|---|---|---|---|
| 860,354 | 7/1907 | Cushing | 102/242 |
| 1,772,613 | 8/1930 | Mellstrom | 102/234 |
| 3,848,531 | 11/1974 | Mellen | 102/245 |
| 4,464,992 | 8/1984 | Bell | 102/241 |
| 5,024,157 | 6/1991 | Nishikawa | 102/252 |

FOREIGN PATENT DOCUMENTS

| | | | |
|---|---|---|---|
| 2306572 | 8/1974 | Germany | 102/255 |
| 2-115056 | 9/1990 | Japan . | |
| 327770 | 2/1958 | Switzerland | 102/255 |

*Primary Examiner*—Stephen M. Johnson
*Attorney, Agent, or Firm*—Burns, Doane, Swecker & Mathis

[57] ABSTRACT

A shock detecting device includes a housing, a weight disposed in the housing and moved by a shock which is more than a predetermined value from outside, an output member rotatably disposed in the housing and rotated in response to the movement of the weight so as to be projected from the housing and a safety mechanism being provided with a stopper pin which is formed on the weight and which contacts with the housing in an initial condition in order to maintain the weight in the initial condition, a rock lever which is rotatably supported on the housing and which being able to engage or disengage with or from the stopper pin and a first urging device which is disposed between the rock lever and the housing always for urging the rock lever so as to be engaged the rock lever with the stopper pin. According to this improved shock detecting device, it is able to maintain the high reliability of the safety mechanism with a simple structure.

11 Claims, 4 Drawing Sheets

SHOCK DETECTING DEVICE

BACKGROUND OF THE INVENTION

1. Field of the Invention

The present invention relates to a shock detecting device, and more particularly to a shock detecting device which mechanically ignites an ignition element without electric power for use as a starting sensor of an anti-shock safety system such as an air-bag and a seatbelt tensioner.

2. Description of the Prior Art

A conventional shock detecting device is disclosed, for example, in Japanese utility model application laid-open publication No. 2(1990)-115056. In this prior shock detecting device, when a shock which is more than a predetermined value is applied from outside, a weight is moved by the shock and then one end of a release lever is pressed by the movement of the weight. Then, the release lever is rotated and the engagement between the other end of the release lever and a firing pin is released. Thereby, the firing pin is projected to the outside of a housing by an urging force of a spring and an ignition element such as a primer is struck by the firing pin.

The above conventional shock detecting device includes a safety mechanism which prevents the operation of the shock detecting device due to the shock in order to prevent an erroneous operation of the shock detecting mechanism before an installation to an anti-shock safety system. The safety mechanism is comprised of a spring urged rock lever which is rotatably supported on the housing and which is engaged with the weight through the release lever and which is positioned on a locus of the movement of the weight and a rock shaft which is movably supported on the housing and which makes the rock lever rotate against the urging force of a spring by means of a cam. Thereby, the safety operation condition under which the weight is not moved by the applied shock is obtained by the engagement between the rock lever and the weight through the release lever. In this safety operation condition, when the rock shaft is moved and then the rock lever is rotated toward the outside of the locus of the movement of the weight against the urging force of the spring by the movement of the rock shaft, the engagement between the rock lever and the weight through the release lever is released. Thereby, the safety release condition in which the weight can move by the applied shock is obtained.

In the safety mechanism of the above conventional shock detecting device, however, the rock lever has to be engaged with the weight through the release lever in order to prevent an easy changeover from the safety operation condition to the safety release condition, namely in order to prevent the rotation of the rock lever due to the movement of the weight according to the shock which is more than the urging force acting on the rock lever. Thereby, extreme accuracy is required to the form and the arrangement of the release lever in order to improve the reliability of the safety device which has to reliably prevent the movement of the weight. Therefore, the manufacturing cost of the shock detecting device is increased and the assembling performance is deteriorated.

SUMMARY OF THE INVENTION

It is, therefore, an object of the present invention to provide an improved shock detecting device which overcomes the above drawbacks.

It is another object of the present invention to provide an improved shock detecting device with a safety mechanism having a high reliability which can assuredly prevent the movement of the weight in the safety operation condition with a simple structure.

In order to achieve these objects, there is provided a shock detecting device which includes a housing, a weight disposed in the housing and moved by a shock which is more than a predetermined value from outside, an output member rotatably disposed in the housing and rotated in response to the movement of the weight so as to be projected from the housing and a safety mechanism being provided with a stopper pin which is formed on the weight and which contacts with the housing in an initial condition in order to maintain the weight in the initial condition, a rock lever which is rotatably supported on the housing and which is able to engage or disengage with or from the stopper pin and a first urging means which is disposed between the rock lever and the housing for always urging the rock lever so as to engage the rock lever with the stopper pin.

According to the above improved shock detecting device, the movement of the weight is prevented by the engagement between the rock lever and the stopper pin in the safety operation condition. The extreme accuracy is required to the form and the arrangement of the stopper pin from the beginning in order to maintain the weight in the initial condition. Therefore, an extreme accuracy is not required to the output member in order to improve the reliability of the safety mechanism and the accuracy of the output member does not influence the reliability of the safety mechanism. Thereby, it is possible to maintain the high reliability of the safety mechanism with a simple structure.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A shock detecting device constituted in accordance with embodiments of the present invention will be described with reference to the attached drawings.

Figure 1:
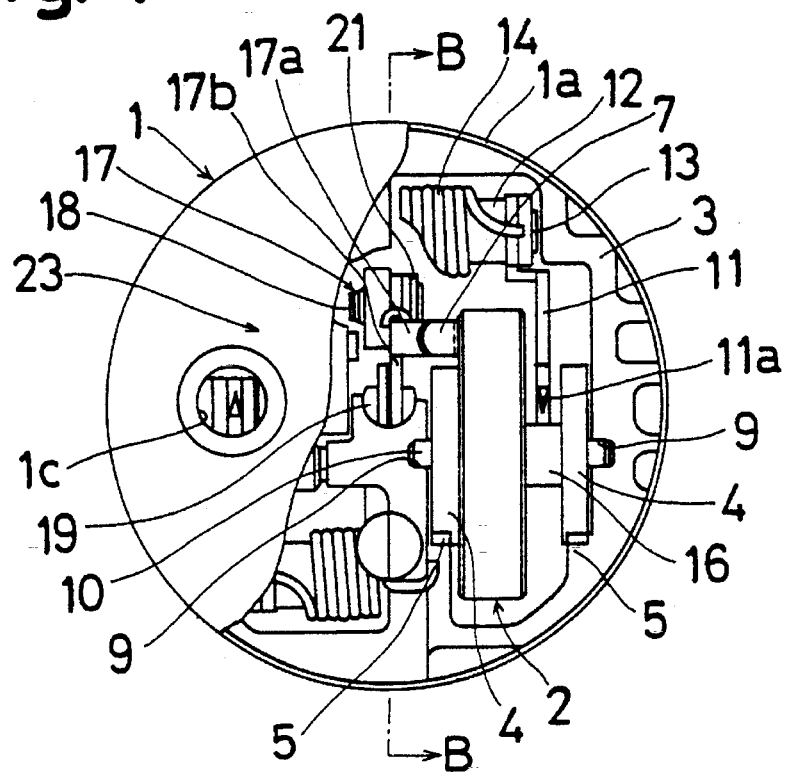
FIG. 1 is a plan view of a first embodiment of a shock detecting device in accordance with the present invention.
Figure 2:
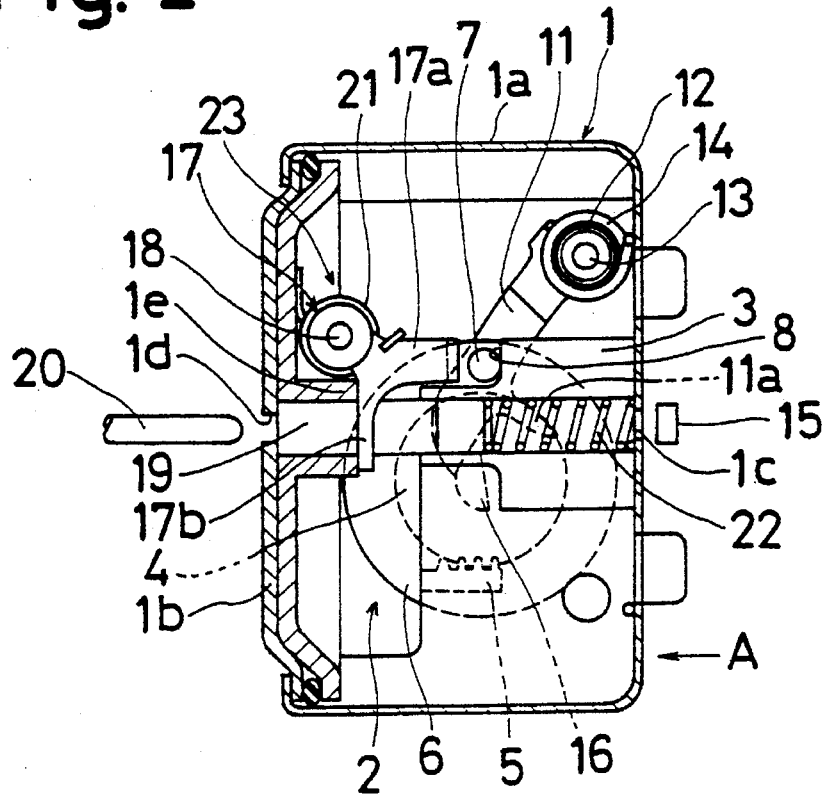
FIG. 2 is a sectional view taken substantially along the line B—B of FIG. 1.

FIG. 1 to FIG. 4 show a first embodiment of the present invention. As shown in FIG. 1 and FIG. 2, a housing 1 is comprised of a cup-shaped member 1a and a cover member 1b. In an inner space of the housing 1 which is defined by the cup-shaped member 1a and the cover member 1b, a shock detecting mechanism 2 is disposed therein.

Referring to FIG. 1 to FIG.4, a frame 3 is fixed to the housing 1. The frame 3 is formed by bending a sheet of seat member. On the frame 3, a pair of rack gears 5 which are able to engage with pinion gears 4 (mentioned later), a stopper wall 8 which is able to contact with a stopper pin 7 formed on a weight 6 (mentioned later) and a pair of guide grooves 9 which guide the movement of the weight 6 are formed thereon in a body.

The weight 6 is movably supported on the guide grooves 9 of the frame 3 through an axis 10. The weight 6 has a disc-shape which centers the axis 10 and which has a large diameter. Thereby, when the weight 6 is rotated and moved, the moment of inertia of the weight 6 can be enlarged and therefore the weight 6 is difficult to rotate by a momentary shock resulting from traveling on a rough road and the like. Fixed on the axis 10 are a pair of pinion gears 4 which are engaged with the rack gears 5.

A stopper pin 7 is formed on the side surface of the weight 6. In the initial condition of the weight 6, the stopper pin 7 contacts with the stopper wall 8 at a position which is about perpendicular to the engaging position between the rack gears 5 and the pinion gears 4 and thereby the initial position of the weight 6 is established.

A firing lever 11 is rotatably supported on the frame 3 by a pin 13 through a collar 12. A torsion spring 14 which engages the frame 3 at its one end and which engages the firing lever 11 at its other end is disposed around the collar 12. Thereby, the firing lever 11 is always urged counterclockwise in FIG. 2 by the urging force of the torsion spring 14. A firing pin 11a is formed on the firing lever 11. The firing pin 11a is able to be projected from a hole portion 1c formed on the housing 1 to the outside of the housing 1 by the rotation of the firing lever 11 so as to strike a primer 15. Now, the firing lever 11 and the firing pin 11a correspond to an output member of the present invention and the torsion spring 14 corresponds to a second urging means of the present invention.

A cam portion 16 having a semicircular shape is formed on the axis 10 and is engageable with the firing lever 11 so as to be releasable therefrom. In the initial condition, the urging force of the torsion spring 14 acts on the weight 6 through the engagement between the firing lever 11 and the cam portion 16 and thereby the weight 6 is maintained in its initial position in which the stopper pin 7 contacts the stopper wall 8 by the urging force of the torsion spring 14.

A rock lever 17 is rotatably supported on the cover member 1b of the housing 1 by a pin 18 and has an approximate L-shape. A rock portion 17a which is able to engage or disengage with or from the stopper pin 7 and an operational portion 17b which is linked to a release shaft 19 (mentioned later) are formed on the rock lever 17 in a body. The release shaft 19 is slidably supported on the frame 3 and a flange portion 1e which is formed on the cover member 1b and holds the operational portion 17b of the rock lever 17. The release shaft is able to engage a release pin 20 which is formed on an anti-shock safety system such as an air-bag and a seatbelt tensioner (not shown) installed the shock detecting device and which is inserted from a hole portion 1d formed on the cover member 1b. A torsion spring 21 is disposed round the pin 18. The torsion spring 21 is engaged with the cover member 1b at its one end and is engaged with the rock lever 17 at its other end. Thereby, the rock lever 17 is always urged clockwise in FIG. 2 so that the rock portion 17a of the rock lever 17 is engaged with the stopper pin 7. Furthermore, a compression spring 22 is disposed between the release shaft 19 and the cup-shaped member 1a. The release shaft 19 is always urged by the urging force of the compression spring 22 so that the rock lever 17 is rotated in order to engage the rock portion 17a of the rock lever 17 with the stopper pin 7. A safety mechanism 23 is constituted by the stopper pin 7, the rock lever 17 and the release shaft 19. Now, the torsion spring 21 corresponds to a first urging means of the present invention.

Figure 3:
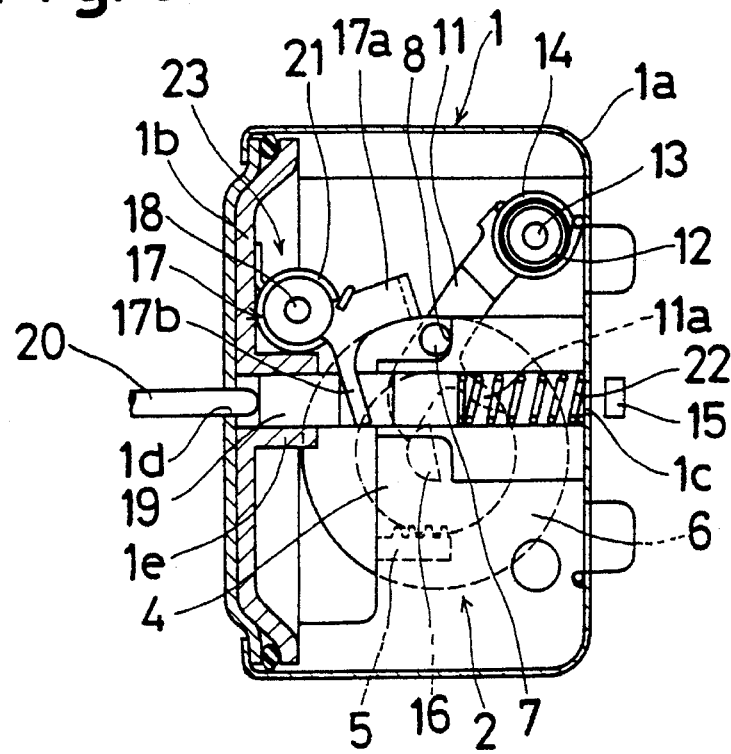
FIG. 3 is a sectional view showing the safety release condition of the safety mechanism of a first embodiment of a shock detecting device in accordance with the present invention.

The safety mechanism 23 operates as follows. FIG. 2 shows a safety operation condition in which the shock detecting device is not installed on the anti-shock safety system. In this safety operation condition, the stopper pin 7 is engaged with the rock portion 17a of the rock lever 17 by the urging force of the torsion spring 21. Thereby, a condition is established in which the movement of the weight 6 is perfectly prevented, namely a non-operational condition in which the shock detecting device can not be operated by the applied shock. In this condition, when the shock detecting device is installed on the anti-shock safety system, the release pin 20 is engaged with the release shaft 19 and the release shaft 19 is slid against the urging force of the compression spring 22 as shown in FIG. 3. The operational portion 17b of the rock lever 17 is moved by the slide of the release shaft 19 and the rock lever 17 is rotated counterclockwise against the urging force of the torsion spring 21 in FIG. 2. Thereby, the rock portion 17a separates from a line of the locus of the movement of the stopper pin 7 and a safety release condition is established in which the engagement between the rock portion 17a and the stopper pin 7 is released. Namely, an operational condition in which weight 6 is movable and in which the shock detecting mechanism 2 can be operated by the applied shock is established. As mentioned above, in the condition in which the shock detecting device is not installed on the anti-shock safety system, since the safety operation condition in which the rock portion 17a of the rock lever 17 is assuredly engaged with the stopper pin 7 by the urging force of the torsion spring 21 is established, the erroneous operation of the shock detecting mechanism 2 generated by a fall or the like before or when the shock detecting device is installed can be prevented. After the the shock detecting device is installed on the anti-shock safety system, the safety release condition arises in which the engagement between the rock portion 17a and the stopper pin 7 is certainly released by the release pin 20. Thereby, the operational condition which allows operation of the shock detecting mechanism 2 can be certainly established.

As mentioned above, in the safety operation condition, the rock portion 17a of the rock lever 17 is engaged with the stopper pin 7 and thereby the movement of the weight 6 is prevented. Extreme accuracy is required with respect to the form and the arrangement of the stopper pin 7 from the beginning in order to establish the initial position of the weight 6. Therefore, further extreme accuracy is not especially required with respect to the stopper pin 7 in order to improve the reliability of the safety mechanism 23 and extreme accuracy is not required with respect to the other parts such as the firing lever 11 and so on in order to improve the reliability of the safety mechanism 23. Accordingly, it is possible to maintain the high reliability of the safety mechanism 23 with a simple structure. Furthermore, the stopper pin 7 is formed on the weight 6 at a distance from the center of gravity of the weight 6 and therefore the moved distance of the stopper pin 7 due to the shock is amplified with respect to the moved distance which the weight 6 moves till the weight 6 detects the shock. Therefore, it is possible to easily recognize by the position of the stopper pin 7 whether the shock was detected or not yet. Thereby, the prevention of the movement of the weight 6 at the position at which the shock was detected can be prevented. Therefore, it is possible to certainly conform the movement of the weight 6 (the detection of the shock) to the safety operation condition or the safety release condition of the safety mechanism 23.

Figure 4:
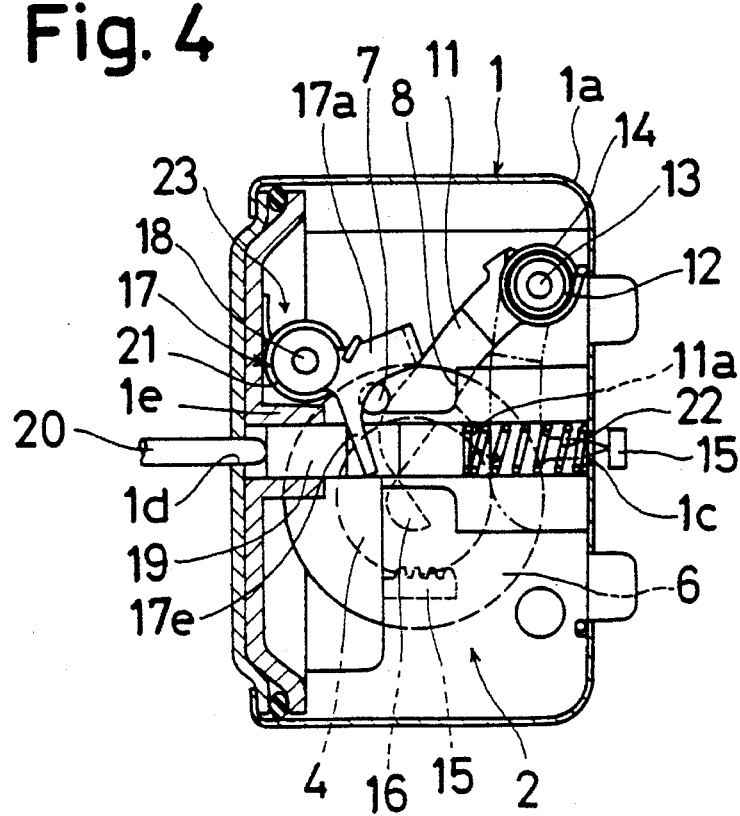
FIG. 4 is a sectional view showing the shock detecting condition of a first embodiment of a shock detecting device in accordance with the present invention.
Figure 5:
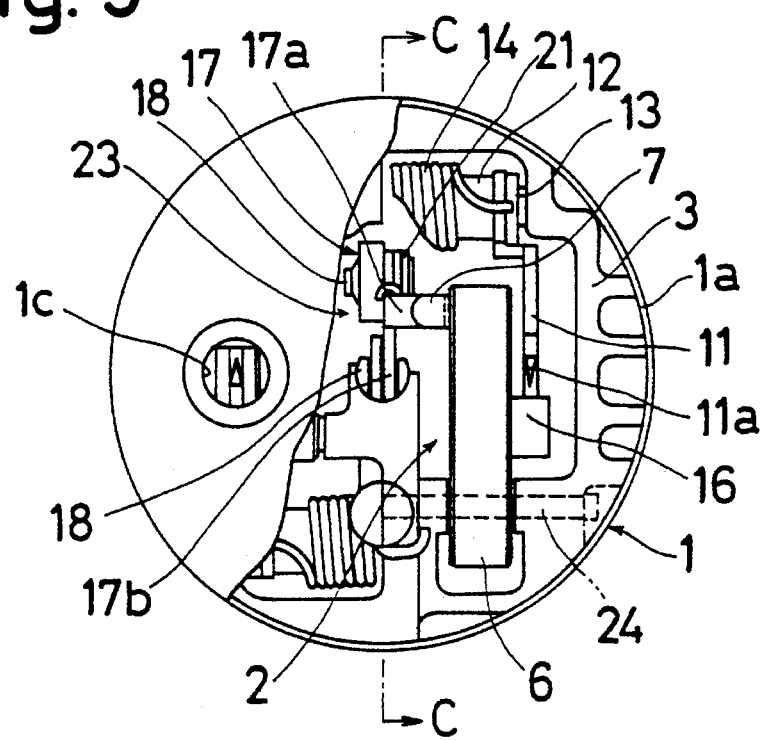
FIG. 5 is a plan view of a second embodiment of a shock detecting device in accordance with the present invention.
Figure 6:
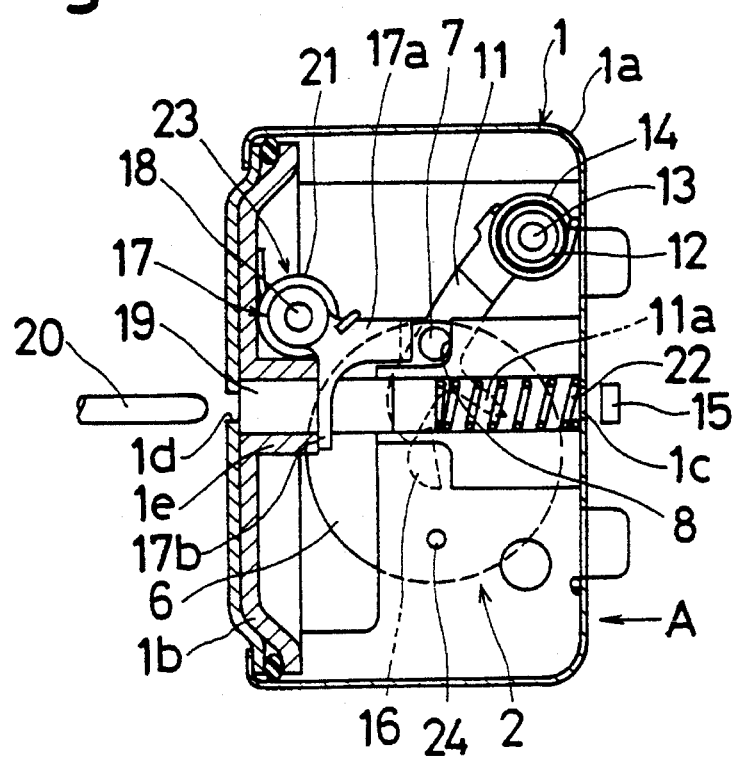
FIG. 6 is a sectional view taken substantially along the line C—C of FIG. 5.
Figure 7:
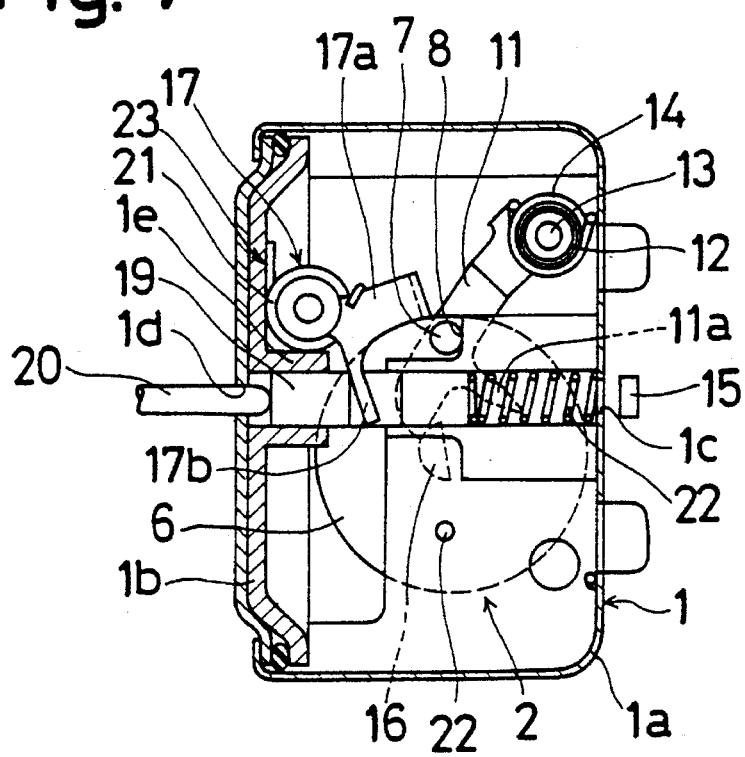
FIG. 7 is a sectional view showing the safety release condition of the safety mechanism of a second embodiment of a shock detecting device in accordance with the present invention.

The above-described first embodiment of the shock detecting device operates as follows. FIG. 3 shows the initial condition of the shock detecting device. In this initial condition, the cam portion 16 is engaged with the firing lever 11 and the weight 6 is maintained in its initial position at which the stopper pin 7 contacts the stopper wall 8 by the urging force of the torsion spring 14. In case of collision of the vehicle or the like, when a shock is applied from the A direction shown in FIG. 2, the weight 6 detects the shock and is rotated and slid against the urging force of the torsion spring 14 by the inertia force according to the shock through the engagement between the pinion gears 4 and the rack gears 5 and therefore the engagement between the cam portion 16 and the firing lever 11 is released as shown in FIG. 4. Thereby, as shown in FIG. 4 by the two dotted chain line, the firing lever 11 is rotated by the urging force of the torsion spring 14 and then the firing pin 11a is projected from the hole portion 1c and strikes a primer 15 which is adjacent to the cup-shaped member 1a. As mentioned above, the torsion spring 14 has two functions. Namely, the torsion spring 14 keeps the weight 6 at its initial position and urges the firing lever 11 so as to rotate after the shock is detected. In this shock detecting operation, since the weight 6 is a disc-shaped-form having a large diameter which centers the axis 10, it is able to enlarge the moment of inertia of the weight 6. Thereby, the momentary shock which is generated in traveling on the rough road and so on is not detected and therefore the misoperation can be prevented. Accordingly, it is possible to improve the reliability of the shock detecting device.

FIG. 5 to FIG. 8 show a second embodiment of the present invention. In the FIG. 5 to FIG. 8, the same parts as compared with FIG. 1 to FIG. 4 are provided with the same reference numerals utilized in FIG. 1 to FIG. 4. Referring to FIG. 5 to FIG. 8, a weight 6 having a disc-shaped-form is movably supported on a frame 3 by a pin 24 at its eccentric position which is shifted from its center of gravity. In this embodiment, a shock detecting device is not provided with the pinion gears 4 and the rack gears 5 of the first embodiment. Since the other structures are the same as the first embodiment, the description is omitted.

Figure 8:
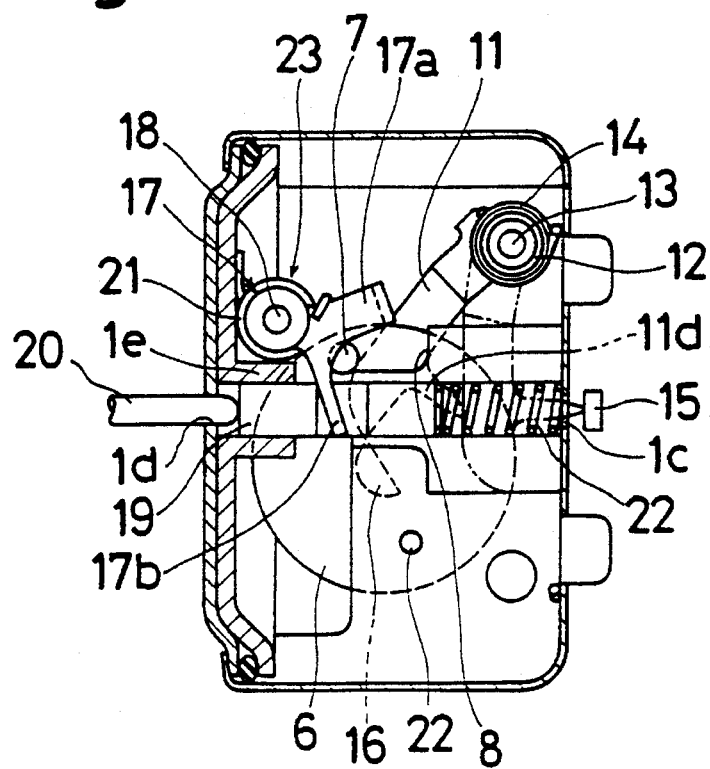
FIG. 8 is a sectional view showing the shock detecting condition of a second embodiment of a shock detecting device in accordance with the present invention.

The second embodiment of the shock detecting device operates as follows. In the initial condition shown in FIG. 7, when the shock is applied in the A direction, the weight 6 detects the shock and is oscilatoried (rotated) round the pin 24 against the urging force of the torsion spring 14 as shown in FIG. 8. Thereby, the cam portion 16 is rotated and slid in the same manner as in the first embodiment. As a result, the engagement between the cam portion 16 and the firing lever 11 is released as shown in FIG. 8 and thereby the firing lever 11 is rotated by the urging force of the torsion spring 14. The operation which follows this condition is the same as in the first embodiment and the effects of this embodiment are the same as in the first embodiment, therefore the description is omitted. As mentioned above, in this embodiment, the rotational slide of the cam portion 16 is obtained by the oscillatory motion of the weight 6 (the eccentric motion of the weight 6 about the pin 24). Thereby, since it is not necessary to use the pinion gears 4 and the rack gears 5 in accordance with the first embodiment, it is possible to reduce the number of parts and decrease the processing steps. Now, the structure, the operation and the effects of the safety mechanism 23 are the same as the first embodiment.

In the above-described embodiments, in order to further improve a reliability for igniting the ignition element and for detecting the shock, a pair of the above-described shock detecting mechanisms 2 are disposed in the housing 1.

According to the present invention, as mentioned above, in the safety operation condition, the rock lever is engaged with the stopper pin and thereby the movement of the weight is prevented. The extreme accuracy is required to the form and the arrangement of the stopper pin from the beginning in order to establish the initial position of the weight. Therefore, the further extreme accuracy is not especially required to the stopper pin in order to improve the reliability of the safety mechanism and an extreme accuracy is not required to the other parts such as the output member and so on in order to improve the reliability of the safety mechanism. Accordingly, it is able to maintain the high reliability of the safety mechanism with a simple structure.

Furthermore, according to the present invention, the stopper pin is formed on the weight at a distance from the center of gravity of the weight and therefore the moved distance of the stopper pin due to the shock is amplified with respect to the moved distance which the weight moves till the weight detects the shock. Therefore, it is possible to easily recognize by the position of the stopper pin whether the shock was detected or not yet. Thereby, the prevention of the movement of the weight at the position which the shock was detected can be prevented. Therefore, it is possible to certainly conform the detection of the shock to the safety operation condition or the safety release condition of the safety mechanism.

The principles, preferred embodiments, and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A shock detecting device for an anti-shock safety system comprising:

a housing, a weight disposed in the housing and moved by an outside shock which is more than a predetermined value, a firing member rotatably disposed in the housing for being rotated in response to the movement of the weight so that a portion of the firing member projects from the housing, and a safety mechanism for preventing the weight from moving during a safety operation condition, the safety mechanism including a stopper pin which is formed on the weight and which contacts the housing in an initial condition in order to maintain the weight in the initial condition, a rock lever which is rotatably supported on the housing and which is engageable with the stopper pin, a first urging means which is disposed between the rock lever and the housing for urging the rock lever into engagement with the stopper pin, and releasing means for disengaging the rock lever from the stopper pin once the shock detecting device is installed on the anti-shock safety system.

2. A shock detecting device as recited in claim 1, wherein the weight is provided with a cam portion which is engageable with and disengageable from the firing member by the movement of the weight.

3. A shock detecting device as recited in claim 2, further comprising guide means disposed between the weight and the housing for guiding the movement of the weight in response to the shock.

4. A shock detecting device as recited in claim 2, wherein the weight is rotatably supported on the housing at an eccentric position which is shifted from a center gravity of the weight so that the weight is rotated around the eccentric position.

5. A shock detecting device as recited in claim 1, including second urging means which is disposed about a rotational shaft of the firing member for urging the firing member in a direction in which a portion of the firing member projects from the housing.

6. A shock detecting device as recited in claim 1, wherein the first urging means is a spring which is disposed about a rotational shaft of the rock lever.

7. A shock detecting device as recited in claim 1, wherein the releasing means includes a release shaft for engaging the rock lever, and a compression spring for normally urging the release shaft in a direction which prevents the release shaft from disengaging the rock lever from the stopper pin.

8. A shock detecting device as recited in claim 7, including a release pin formed on the anti-shock safety system for engaging the release shaft, the rock lever being engaged with the stopper pin of the weight when the release pin of the anti-shock safety system is disengaged from the release shaft.

9. An anti-shock safety system comprising:
a release pin;
a shock detecting device comprising:
  a housing;
  a weight disposed in the housing and moved by an outside shock which is more than a predetermined value;
  a firing member rotatably disposed in the housing and rotated in response to the movement of the weight so that a portion of the firing member projects from the housing; and
  a safety mechanism for preventing the weight from moving during a safety operation condition, the safety mechanism comprising a stopper pin which is formed on the weight and which contacts the housing in an initial condition in order to maintain the weight in the initial condition, a rock lever which is rotatably supported on the housing and which is engageable with the stopper pin, first urging means disposed between the rock lever and the housing for urging the rock lever into engagement with the stopper pin, and releasing means for being engaged by the release pin to disengage the rock lever from the stopper pin.

10. An anti-shock safety system as recited in claim 9, wherein the releasing means includes a release shaft for engaging the rock lever, and a compression spring for urging the release shaft in a direction which prevents the release shaft from disengaging the rock lever from the stopper pin.

11. An anti-shock safety system as recited in claim 10, wherein the rock lever is engaged with the stopper pin of the weight when the release pin of the anti-shock safety system is disengaged from the release shaft.

* * * * *